United States Patent [19]

Buchwald

[11] 4,105,222
[45] Aug. 8, 1978

[54] INDEPENDENT FRONT SUSPENSION SYSTEM

[75] Inventor: Robert M. Buchwald, Birmingham, Mich.

[73] Assignee: General Motors Corporation, Detroit, Mich.

[21] Appl. No.: 745,126

[22] Filed: Nov. 26, 1976

[51] Int. Cl.² .................................... B60G 11/56
[52] U.S. Cl. ........................ 280/668; 180/43 R; 267/34
[58] Field of Search ............... 280/661, 666, 667, 668, 280/670, 673, 674, 675, 691, 701, 724, 726; 180/43 R; 267/64 R, 20 A, 34

[56] References Cited

U.S. PATENT DOCUMENTS

| | | | |
|---|---|---|---|
| 2,992,015 | 7/1961 | Halford et al. | 280/696 |
| 3,024,039 | 3/1962 | Zeigler et al. | 280/106.5 R |
| 3,037,787 | 6/1962 | Gottschald | 280/668 |
| 3,387,840 | 6/1968 | Bechman et al. | 267/64 R |
| 3,414,287 | 12/1968 | Weiertz | 280/666 |
| 3,490,785 | 1/1970 | Moss | 280/668 |
| 3,589,701 | 6/1971 | Gee | 280/668 |
| 3,703,215 | 11/1972 | Takahashi | 280/668 |
| 3,917,308 | 11/1975 | Schulz | 280/691 |
| 4,026,578 | 5/1977 | Mattson | 280/668 |

FOREIGN PATENT DOCUMENTS

| | | | |
|---|---|---|---|
| 2,431,675 | 1/1976 | Fed. Rep. of Germany | 280/668 |
| 2,453,642 | 5/1976 | Fed. Rep. of Germany | 280/668 |

*Primary Examiner*—Kenneth H. Betts
*Attorney, Agent, or Firm*—John P. Moran

[57] ABSTRACT

An independent strut-type suspension system for a front wheel drive vehicle, wherein the shock absorber is secured at the lower end thereof to the steering knuckle at an angle such that it extends rearwardly of the drive shaft and below the center line thereof, providing a low overall height profile, coupled with anti-dive and anti-lift characteristics, with a coil spring mounted eccentrically around the shock absorber to diminish bending moments on the shock absorber.

5 Claims, 4 Drawing Figures

INDEPENDENT FRONT SUSPENSION SYSTEM

This invention relates generally to an independent front suspension system and, more particularly, to an independent front wheel drive suspension system.

Heretofore, in the usual strut-type front wheel drive suspension system the shock absorber has generally been mounted with its lower end on the vehicle steering knuckle just above the drive shaft. Accordingly, it is apparent that the overall height of such arrangements is relatively high, requiring an elevated hood configuration, as opposed to the current trend toward a low hood configuration. In other instances the shock absorber has been secured at its lower end to the lower control arm, with the coil spring being mounted concentrically around the shock absorber, with no consideration being given to an anti-dive characteristic while braking or to an anti-lift characteristic while accelerating.

Accordingly, a general object of the invention is to provide an improved independent front wheel drive strut-type suspension system which results in a low front profile for the vehicle, while providing desirable anti-dive and anti-lift characteristics and subjecting the shock absorber to minimal bending moments during compression and rebounding of the shock absorber and associated coil spring.

Another object of the invention is to provide an improved independent front wheel drive strut-type suspension system wherein the shock absorber is angled downwardly and rearwardly of the drive shaft, with the lower end thereof being positioned substantially below the axis of the drive shaft and secured to the steering knuckle, thereby providing a low overall height profile while providing desirable anti-dive and anti-lift characteristics.

A further object of the invention is to provide such an independent front wheel drive suspension system, wherein the coil spring is eccentrically mounted around the shock absorber such that its axis, or the center line of the spring force, intersects the ground as near as possible to the center of the so called "tire patch" or contact area of the tire with the ground, in order to reduce bending moments on the shock absorber.

Still another object of the invention is to provide a low profile independent front wheel drive suspension system including a laterally extending control arm having its inner end pivotally connected to the vehicle frame, a steering knuckle pivotally connected to the outer end of the control arm for pivotally supporting a road wheel, a shock absorber having its upper end pivotally connected to a frame mounted tower at a point which together with the center of the pivotal connection between the steering knuckle and the control arm defines a predetermined kingpin axis, and its lower end connected by suitable bracketry to the steering knuckle and extended rearwardly of the drive shaft at a predetermined angle for anti-dive and anti-lift characteristics and substantially below the center of the wheel for a low overall height, an upper retainer bracket formed concentrically around the upper end of the shock absorber and a lower retainer bracket formed eccentrically around an intermediate portion of the shock absorber such that the axis through the upper and lower retainer brackets is substantially coincident with the center of the contact area of the tire with the ground, and a coil spring mounted around the shock absorber and confined between the upper and lower retainer brackets to minimize bending moments on the shock absorber during compression and rebounding of the spring under road load conditions.

A still further object of the invention is to provide a strut-type suspension system wherein the upper end of the shock absorber is mounted in a bearing around which an elastomeric bushing is bonded, with the end portions of the elastomeric bushing being respectively bonded to a fixed support bracket and to a spring retainer bracket mounted around the shock absorber.

Still another object of the invention is to provide an alternate strut-type suspension arrangement wherein the upper end of the shock absorber has a mounting block formed thereon and secured to a mating block with an upper spring retainer flange confined therebetween. The mating block has an extension formed on a side surface thereof and includes a socket in which a ball end of a bolt is mounted. The bolt is, in turn, supported in an inner metal sleeve having an elastomeric bushing bonded thereto and within a fixed outer metal sleeve.

These and other objects and advantages of the invention will be apparent when reference is made to the following description and accompanying drawings, wherein.

Figure 1:
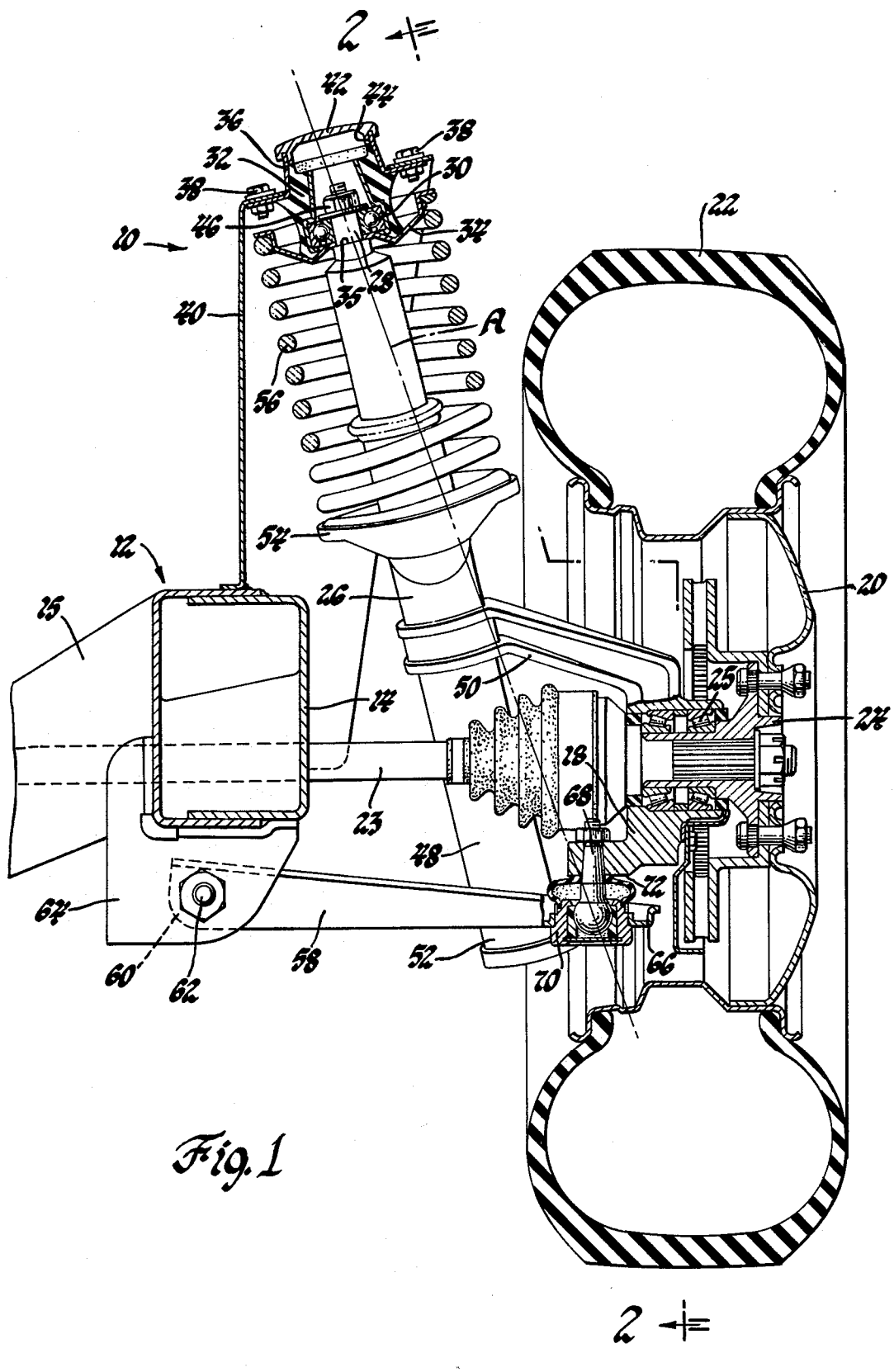
FIG. 1 is a fragmentary cross-sectional view of a vehicular frame embodying the inventive front wheel drive strut-type suspension system.

Referring now to the drawings in greater detail, FIG. 1 illustrates a low profile independent strut-type suspension system 10 operatively connected between a vehicular supporting frame 12, including side rails 14 and an interconnecting front cross member 15, and a steering knuckle 18 rotatably supporting a road wheel 20 and an associated tire 22.

Drive shafts 23 extending laterally in both directions from a differential (not shown) are splined at their respective outer ends to wheel carriers 24 which are rotatably supported by bearings 25 in the steering knuckles 18.

The suspension system 10 includes a shock absorber 26 pivotally mounted at its offset upper end 28 in bearings 30 supported in an elastomeric bushing 32 confined between a retainer member 34 concentrically mounted on the shoulder 35 of the shock absorber and a support bracket 36 secured by bolts 38 to a tower member 40 extending upwardly from each side rail 14. A cover 42 is mounted on an opening 44 formed in the support bracket 36, providing access to a nut 46 which secures the upper end 28 of the shock absorber 26 to the bearing 30.

The shock absorber 26 extends downwardly such that the lower end 48 thereof is positioned rearwardly of the drive shaft 23 and below the centerline thereof, and is connected by upper and lower brackets 50 and 52 (FIG. 2), respectively, to the steering knuckle 18. A retainer member 54 is eccentrically formed on the shock absorber 26 at an intermediate point therealong, above the upper bracket 50. A coil spring 56 is mounted around the upper portion of the shock absorber 26 between the upper concentric retainer member 34 and the lower eccentric retainer member 54.

A lower control arm 58 is pivotally mounted at its inner ends 60 by bolts 62 to a support bracket 64 secured to each side rail 14. The outer end 66 of the lower control member 58 is pivotally connected by a stud 68, on which an elastomeric bushing 70 is molded, to a bottom mounting surface 72 of the steering knuckle 18. The kingpin or steering axis A is thus defined as an imaginary line between the center of the upper end 28 of the shock absorber 26 and the center of the pivotal connection between the lower control arm 58 and the lower bracket 52.

In the above arrangement, in view of the end 48 of the shock absorber 26 extending a substantial distance below the axis of the drive shaft 23 and the wheel 20, it is apparent that the upper end 28 of the shock absorber defines a low profile configuration suitable for use with a vehicle designed with a low hood height. Also, by virtue of the shock absorber 26 extending rearwardly of the drive axis, the angle thereof may be selected so as to provide preferable anti-dive and anti-lift characteristics in response to movement of the spring 56 and components of the shock absorber 26 through the jounce space from the fully compressed position to the full rebound position during braking and accelerating operations. It is essential that within the physical limits of the overall system, the axis of the spring 56, or center line of the spring force, intersect the ground as near as possible to the center of the so called "tire patch" or contact area of the tire 22 with the ground, in order to reduce bending moments on the shock absorber 26.

Figure 3:
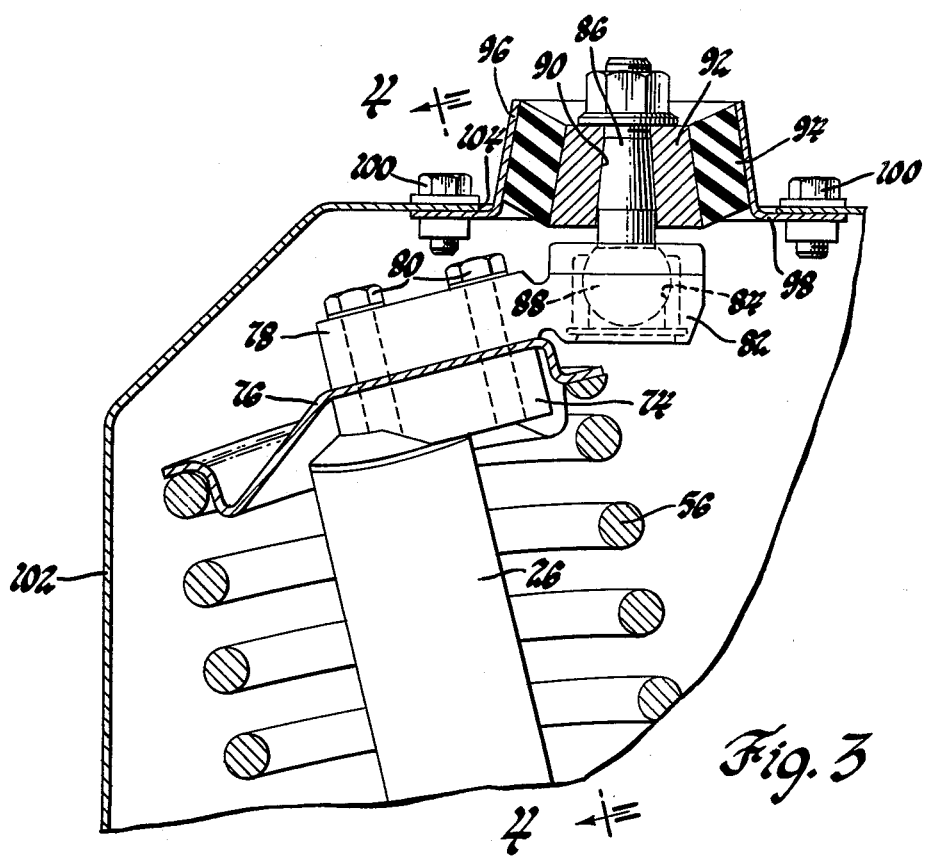
FIG. 3 is a fragmentary cross-sectional view of an alternate embodiment of the upper mounting portion of the FIG. 1 structure; and, FIG. 4 is a cross-sectional view taken along the plane of the line 4—4 of FIG. 3, and looking in the direction of the arrows.
Figure 4:
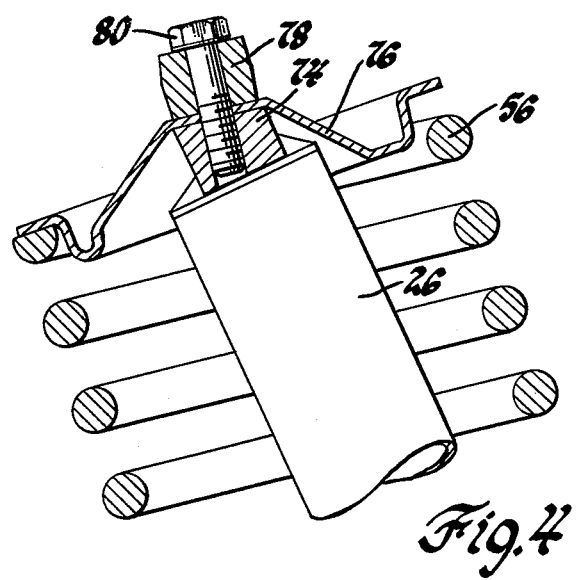

Referring now to FIGS. 3 and 4, an alternate mounting arrangement for the upper end of the shock absorber 26 is disclosed. In this embodiment, a mounting block 74 is formed on the shock absorber 26 as the upper end thereof. A specially contoured spring retainer member 76 is confined between the upper surface of the mounting block 74 and the bottom surface of a second or upper block 78, and secured therebetween by metal screws 80 threadedly connecting the blocks 74 and 78.

An extension 82, having a socket 84 formed therein, is formed on a side surface of the upper block 78. A tapered bolt 86, having a ball end 88 mounted in the socket 84, extends upwardly through a tapered opening 90, formed in a frustoconical shaped metal sleeve 92. An elastomeric sleeve 94 is bonded at its inner surface to the outer surface of the metal sleeve 92, and at its outer surface to an inner surface of an upwardly converging metal sleeve member 96. The latter sleeve member 96 has an external flange 98 formed at the lower, larger end thereof for connection by bolts 100 to an inner surface of a tower member 102, adjacent an opening 104 formed in the top thereof. The tower member 102 is connected at the bottom thereof to the side rail 14, similar to the tower member 40 of the FIG. 1 structure.

In particular vehicle applications the arrangement of FIGS. 3 and 4 may provide for more suitable locations of the shock absorber 26 and the surrounding eccentrically mounted spring 56 with respect to space and operational characteristics.

It should be apparent that the invention provides a compact and efficient front wheel drive, strut-type suspension system, wherein a low overall height is possible, coupled with anti-dive and anti-lift characteristics during braking and accelerating, while minimizing bending moments on the shock absorber during operational conditions.

Figure 2:
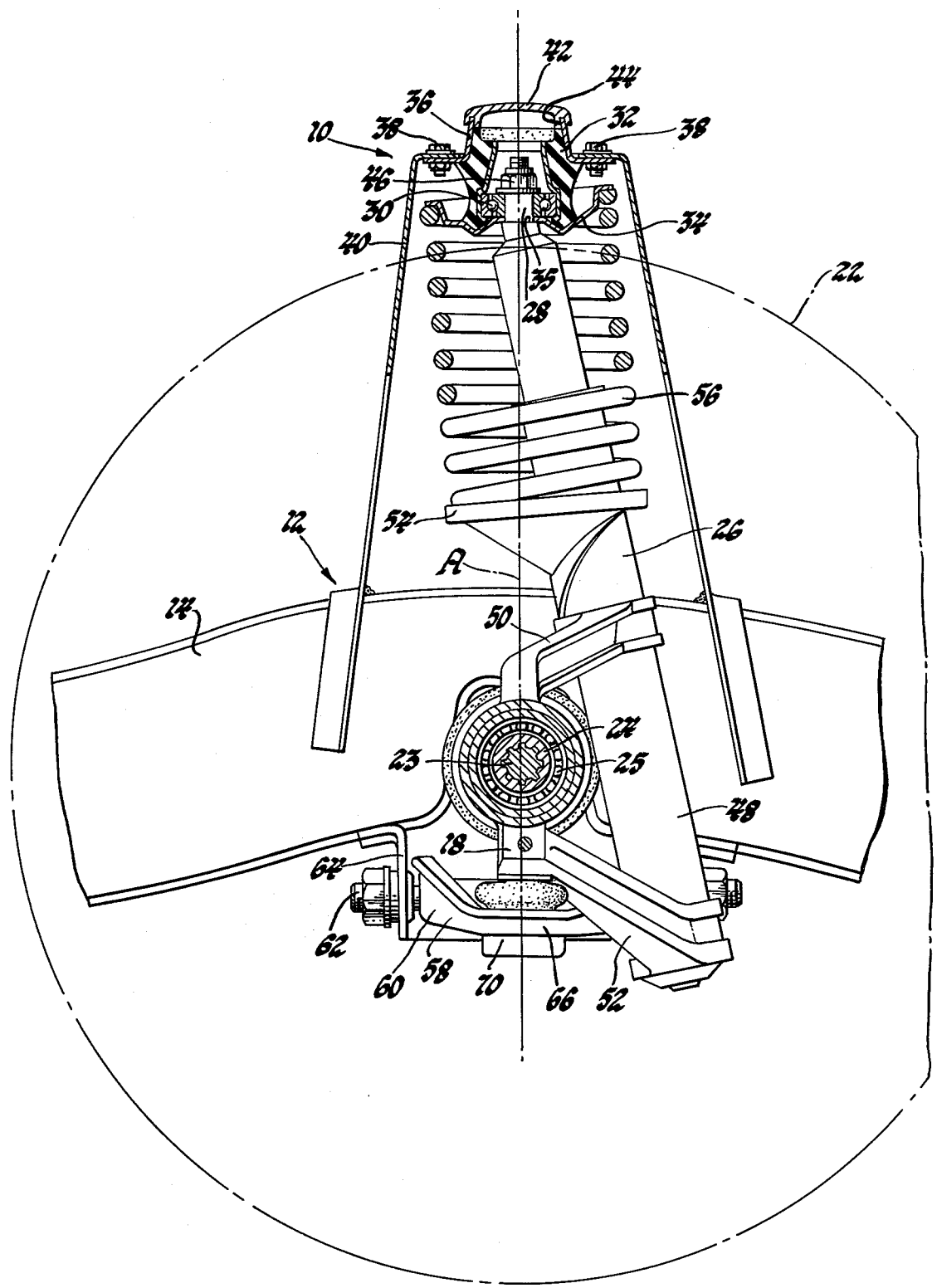
FIG. 2 is a cross-sectional view taken along the plane of the line 2—2 of FIG. 1, and looking in the direction of the arrows.

It should be noted that, in lieu of the bearings 30 of the FIGS. 1 and 2 arrangement and the ball 88 and socket 84 of the FIGS. 3 and 4 arrangement, the upper end 28 of the shock absorber 26 could be secured directly to the tower member 40 and 102, respectively, with suitable bearing means mounted in the upper or lower retainer members adjacent an end of the coil spring 56, with rotation occurring via the insulator and spring.

While but two embodiments of the invention have been shown and described, other modifications thereof are possible.

What is claimed is:

1. An independent suspension system for a front wheel drive motor vehicle having a supporting frame and a road wheel and tire, said system comprising a laterally extending control arm having its inner end pivotally connected to said frame; a steering knuckle pivotally connected to the outer end of said control arm for rotatably supporting said wheel; a shock absorber having its lower end connected to said steering knuckle and its axis inclined with respect to a vertical transverse plane at a predetermined angle for anti-dive and anti-lift characteristics, and its upper end pivotally connected to said frame forward of its lower end at a point which together with the center of the pivotal connection between the steering knuckle and the control arm defines a predetermined steering axis; a coil spring mounted around said shock absorber, the upper end thereof being concentric with said shock absorber and the lower end thereof being eccentric with said shock absorber; and retainer means secured to said shock absorber for retaining said upper and lower ends of said coil spring.

2. A low profile independent suspension system for a front wheel drive motor vehicle having a supporting frame and a road wheel and tire, said system comprising a laterally extending control arm having its inner end pivotally connected to said frame; a steering knuckle pivotally connected to the outer end of said control arm for rotatably supporting said wheel; a tower member formed on said frame; elastomeric mounted bearing means operatively connected to said tower member; bracket means formed on said steering knuckle; a shock absorber having its lower end connected to said bracket means rearwardly of a vertical transverse plane and below the center of said wheel at a predetermined angle for anti-dive and anti-lift characteristics and a low overall height, and its upper end connected to said elastomeric mounted bearing means forward of said lower end at a point which together with the center of the pivotal connection between the steering knuckle and the control arm defines a predetermined kingpin axis; an upper retainer bracket formed concentrically around said upper end of said shock absorber; a lower retainer bracket formed eccentrically around an intermediate portion of said shock absorber such that the axis through said upper and lower retainer brackets is substantially coincident with the center of the contact area of said tire with the ground; and a coil spring mounted around said shock absorber and confined between said upper and lower retainer brackets.

3. A low profile independent suspension system for a front wheel drive motor vehicle having a supporting frame and a road wheel and tire, said system comprising a laterally extending control arm having its inner end pivotally connected to said frame; a steering knuckle pivotally connected to the outer end of said control arm for rotatably supporting said wheel; a tower member formed on said frame; a support bracket secured to said tower; an elastomeric bushing mounted on said support bracket; a bearing supported around an inner surface of said elastomeric bushing; a pair of brackets secured to respective upper and lower portions of said steering knuckle and extending rearwardly therefrom; a shock absorber having its axis inclined in the longitudinal direction such that its lower end is connected to said pair of brackets so as to extend below the center of said wheel at a predetermined angle with respect to vertical for anti-dive and anti-lift characteristics and a low overall height, and its upper end mounted in said bearing forward of said lower end and such that the center thereof, together with the center of the pivotal connection between the steering knuckle and the control arm, defines a predetermined kingpin axis; an upper retainer bracket formed concentrically around an upper portion of said shock absorber adjacent said upper end thereof; a lower retainer bracket formed eccentrically around an intermediate portion of said shock absorber such that the axis through said upper concentric and lower eccentric retainer brackets is substantially coincident with the center of the contact area of said tire with the ground; and a coil spring mounted around said shock absorber and confined between said upper and lower retainer brackets.

4. A low profile independent suspension system for a front wheel drive motor vehicle having a supporting frame and a road wheel and tire, said system comprising a laterally extending control arm having its inner end pivotally connected to said frame; a steering knuckle pivotally connected to the outer end of said control arm for rotatably supporting said wheel; a tower member formed on said frame; elastomeric-mounted ball shaped means connected to said tower member; socket means formed on the upper end of said shock absorber; bracket means formed on said steering knuckle; a shock absorber having its lower end connected to said bracket means rearwardly of a vertical transverse plane and below the center of said wheel at a predetermined angle for anti-dive and anti-lift characteristics and a low overall height, and said socket means on its upper end operatively connected to said ball shaped means forward of said lower end and such that the center of said upper end, together with the center of the pivotal connection between the steering knuckle and the control arm, defines a predetermined kingpin axis; an upper retainer bracket formed concentrically around said upper end of said shock absorber; a lower retainer bracket formed eccentrically around an intermediate portion of said shock absorber such that the axis through said upper and lower retainer brackets is substantially coincident with the center of the contact area of said tire with the ground; and a coil spring mounted around said shock absorber and confined between said upper and lower retainer brackets.

5. A low profile independent suspension system for a front wheel drive motor vehicle having a supporting frame and a road wheel and tire, said system comprising a laterally extending control arm having its inner end pivotally connected to said frame; a steering knuckle pivotally connected to the outer end of said control arm for rotatably supporting said wheel; a tower member formed on said frame; an upwardly converging sleeve member secured to said tower; an elastomeric bushing bonded to the inner surface of said sleeve member; a frustoconical shaped sleeve member bonded to the inner surface of said elastomeric bushing; a tapered bolt mounted through said frustoconical shaped sleeve member; a ball end formed on the lower extension of said tapered bolt; a shock absorber; a first block formed on the upper end of said shock absorber; a retainer member mounted on said first block so as to be concentric with said shock absorber, a second block mounted on said retainer member; fastener means securing said first block, said retainer member and said second block together; a socket formed on a side of said second block and pivotally mounted on said ball end; a pair of brackets secured to respective upper and lower portions of said steering knuckle and extending rearwardly therefrom, the lower end of said shock absorber being connected to said pair of brackets so as to extend below the center of said wheel at a predetermined angle with respect to vertical for anti-dive and anti-lift characteristics and a low overall height, and the center of the upper end of said shock absorber, together with the center of the pivotal connection between the steering knuckle and the control arm, defining a predetermined kingpin axis; a lower retainer bracket formed eccentrically around an intermediate portion of said shock absorber such that the axis through said upper concentric and lower eccentric retainer brackets is substantially coincident with the center of the contact area of said tire with the ground; and a coil spring mounted around said shock absorber and confined between said upper and lower retainer brackets.

* * * * *